United States Patent
Webb

(10) Patent No.: US 8,587,392 B1
(45) Date of Patent: Nov. 19, 2013

(54) PERMANENT MAGNET MOC LATCH FOR SEISMIC QUALIFICATION

(71) Applicant: ABB Technology AG, Zurich (CH)

(72) Inventor: John C. Webb, Florence, SC (US)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 13/913,561

(22) Filed: Jun. 10, 2013

Related U.S. Application Data

(60) Provisional application No. 61/660,839, filed on Jun. 18, 2012.

(51) Int. Cl.
*H01H 3/60* (2006.01)

(52) U.S. Cl.
USPC .......... 335/158; 335/13; 335/157; 200/50.32; 200/337; 200/400

(58) Field of Classification Search
USPC .............. 335/13, 156, 157; 200/50.32, 50.37, 200/50.39, 337, 400
See application file for complete search history.

(56) References Cited

U.S. PATENT DOCUMENTS

| | | |
|---|---|---|
| 2,524,525 A | 11/1945 | Hermann et al. |
| 5,856,643 A | 1/1999 | Gress, Jr. et al. |

FOREIGN PATENT DOCUMENTS

| | | | |
|---|---|---|---|
| DE | 102005050693 A1 | | 4/2007 |
| KR | 594895 B1 | * | 6/2006 |

OTHER PUBLICATIONS

International Search Report and Written Opinion in PCT/US13/44879 dated Sep. 5, 2013.

* cited by examiner

*Primary Examiner* — Ramon Barrera
(74) *Attorney, Agent, or Firm* — Manelli Selter PLLC; Edward J. Stemberger

(57) ABSTRACT

A MOC operator structure for a circuit breaker includes linkage structure coupled between the operating mechanism and an interface structure. An armature is associated with the linkage structure. Permanent magnet structure is associated with the circuit breaker and is disposed generally adjacent to the armature. Wherein, when the operating mechanism is coupled with the linkage structure and the operating mechanism moves in a first direction, a portion of the linkage structure moves in a first direction and moves the MOC operator structure to an open position, with the armature being magnetically engaged with permanent magnet structure to maintain the MOC operator structure in the open position. When the portion of the operating mechanism moves in a second direction, the portion of the linkage structure moves in a second direction and moves the MOC operator structure to a closed position, with the armature magnetically disengaging from the permanent magnet structure.

19 Claims, 3 Drawing Sheets

PERMANENT MAGNET MOC LATCH FOR SEISMIC QUALIFICATION

FIELD

The invention relates to mechanism operated cell (MOC) switches for switchgear assemblies containing draw-out circuit breakers and, more particularly, to structure for holding the MOC switch in the open position under severe vibratory conditions. The invention also relates to a MOC switch that returns to the fully open position with a minimum expenditure of the total energy the circuit breaker has available for closing.

BACKGROUND

Mechanism Operated Cell (MOC) switches or "MOCs" are electrical auxiliary contacts mounted on the stationary portions of switchgear assemblies containing draw-out circuit breakers. These MOC switches change state with the open/closed state of the circuit breaker. Early implementations of MOC switches were driven directly from the circuit breaker mechanism and thus were firmly retained in either the open or closed position as appropriate.

Previous applications of Mechanism Operated Cell (MOC) operator structures (MOCs) were originally part of old technology interrupting mechanisms which typically had a surfeit of energy and moved relatively slowly between the open and closed positions. As such, the MOCs were firmly attached directly to the circuit breaker operating mechanisms and thus both open and closed positions were fixed and not subject to motion from seismic or other external influences. The opening position was fixed by the open position of the mechanism in this case. New circuit breakers utilizing MOCs or replacement circuit breakers utilizing new technology interrupting methods (e.g., vacuum) often move at a higher velocity and have less excess energy that can be devoted to MOC operation. A variety of methods have been employed to 'decouple' the closing of the MOC from the basic circuit breaker operation in order to slow down the MOC motion and reduce the amount of energy consumed by the MOC operation. Often this means that a MOC in the open position is loosely held in position such that during a seismic event, false operation of the MOC switch can occur. Alternatively, friction in the mechanism can prevent the full and complete return of the MOC to the open position. In order to ensure the MOC moves to the fully open position and to prevent false operation of the MOC during a seismic event (e.g., earthquake) is it necessary to ensure sufficient holding force is available in both the closed and open positions. Normally the closed position is secure having been driven to that position, either directly or indirectly, by the circuit breaker operating mechanism. The open position often depends upon the operation of cell mounted MOC return spring; which may not be adequate to hold the MOC in an 'open' position during seismic events.

A conventional solution to this problem is to add an additional MOC return spring to the circuit breaker to force the MOC to the open position and hold it in that position. Unfortunately, the use of such a return spring involves adding an additional and continuous load to the MOC operation and thus increases the amount of energy required to be taken from circuit breaker mechanism. In particular, the simplest and most common method of employing such a return spring is as a spring directly opposing the closing of the MOC. In order to accomplish its mission of firmly holding the MOC in the open position when the breaker is open the spring requires a fairly high initial load and the space available for such a spring is typically rather small leading to a high spring rate. Thus any return spring force which opposes the closing is high and continues to increase fairly substantially. Making matters worse, in most applications, the closing of the MOC is also opposed by a cell mounted MOC return spring which has the same characteristics as the newly installed breaker mounted MOC return spring, e.g., a substantial initial load and a spring rate which leads to a rapidly increasing force which also opposes the breaker closing. Furthermore, in most circuit breaker mechanisms, the initial available closing energy is high and is consumed nearly completely by the closing operation itself, leaving relatively little excess energy at the end of the closing stroke. Thus, the available closing forces are initially high but decrease as the closing sequence nears completion. However, the forces opposed to the closing increase as the breaker reaches its final closed position.

Thus, there is a need to provide a force to hold a MOC in its open position firmly when the breaker is fully open, with the force rapidly decreasing or disappearing entirely as the breaker proceeds through its closing operation.

SUMMARY

An object of the invention is to fulfill the need referred to above. In accordance with the principles of the present invention, this objective is achieved by providing a mechanism-operated cell (MOC) operator structure for a circuit breaker. The circuit breaker includes an operating mechanism that closes contacts of the circuit breaker. The MOC operator structure is associated with an interface structure for controlling auxiliary switches. The MOC operator structure includes linkage structure constructed and arranged to be coupled between the operating mechanism and the interface structure. An armature is associated with the linkage structure. Permanent magnet structure is associated with the circuit breaker and is disposed generally adjacent to the armature. When the operating mechanism is coupled with the linkage structure and at least a part of the operating mechanism moves in a first mechanism direction, a portion of the linkage structure moves in a first linkage direction and moves the MOC operator structure to an open position, with the armature being magnetically engaged with the permanent magnet structure to maintain the MOC operator structure in the open position. When the portion of the operating mechanism moves in a second mechanism direction, the portion of the linkage structure moves in a second linkage direction and moves the MOC operator structure to a closed position, with the armature magnetically disengaging from the permanent magnet structure.

In accordance with another aspect of an embodiment, a method is provided for securing a mechanism-operated cell (MOC) operator structure of a vacuum circuit breaker in an open position. The circuit breaker includes an operating mechanism that closes contacts of the circuit breaker. The MOC operator structure is associated with an interface structure for controlling auxiliary switches. The method couples the MOC operator structure between the operating mechanism and the interface structure such that movement of a part of the operating mechanism moves MOC operator structure between the open position and a closed position. A magnetic field magnetically holds the MOC operator structure when in the open position, with strength of the magnetic field permitting movement of the MOC operator structure by the operating mechanism from the held open position to the closed position.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings wherein like numbers indicate like parts, in which.

DETAILED DESCRIPTION OF THE EXEMPLARY EMBODIMENT

Figure 1:
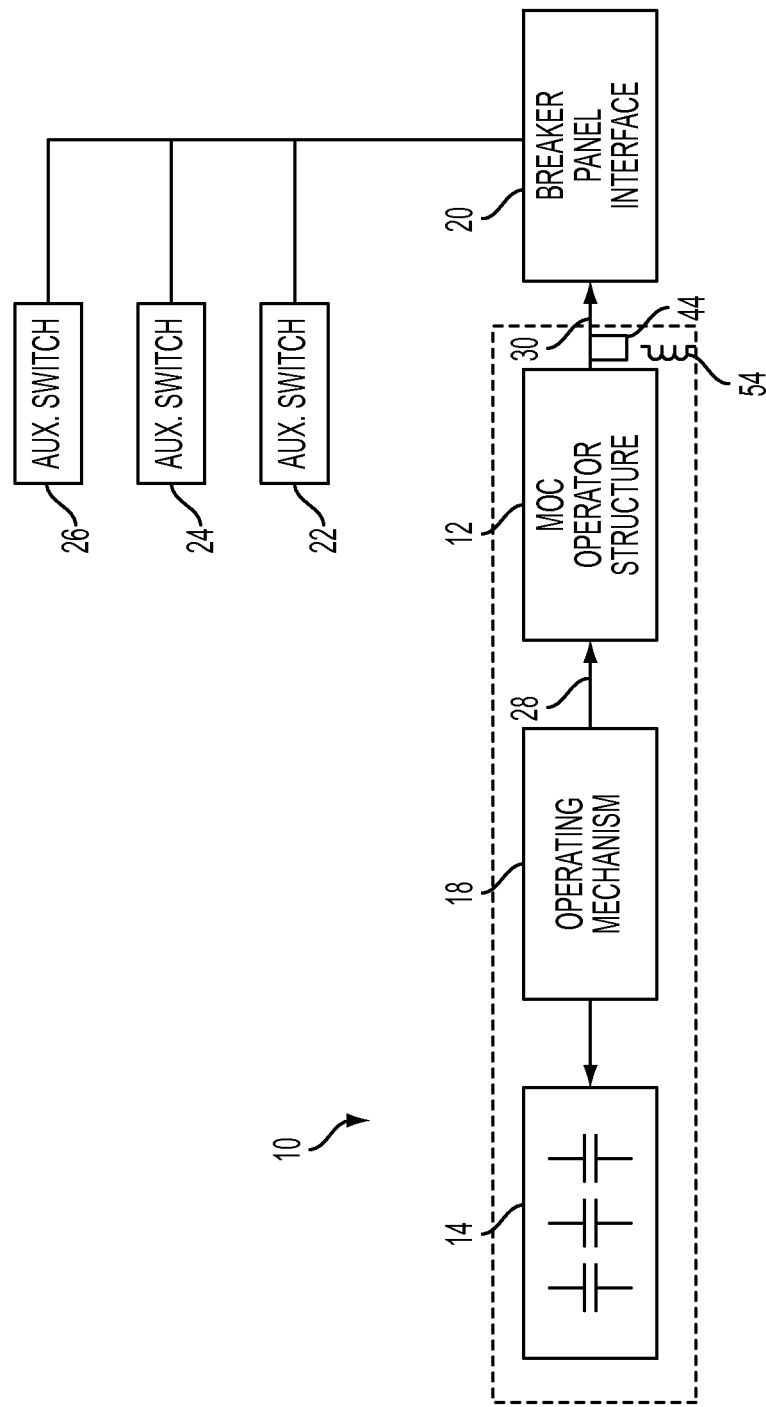
FIG. 1 is a block diagram of a vacuum circuit breaker having a MOC operator structure provided in accordance with an embodiment.

FIG. 1 illustrates a circuit breaker, generally indicated at 10, having a mechanism-operated cell (MOC) operator structure 12. The circuit breaker 10 includes separable contacts 14 having an open position and a closed position in the conventional manner. An operating mechanism 18 is provided for moving the separable contacts 14 between the open and closed positions, and for moving the MOC operator structure 12. The MOC operator structure 12 is associated with a breaker panel interface structure 20 for moving one or more auxiliary switches (AS) 22, 24, and 26. Thus, when the operating mechanism 18 moves the separable contacts 14 to the closed position, the MOC operator structure 12 moves the breaker-panel interface structure 20 to one position, which causes the auxiliary switches 22, 24, 26 to move to a closed position. When the operating mechanism 18 moves the separable contacts 14 to the open position, the MOC operator structure 12 moves the breaker-panel interface structure 20 to another position, which causes the auxiliary switches 22, 24, 26 to move to an open position.

Figure 2:
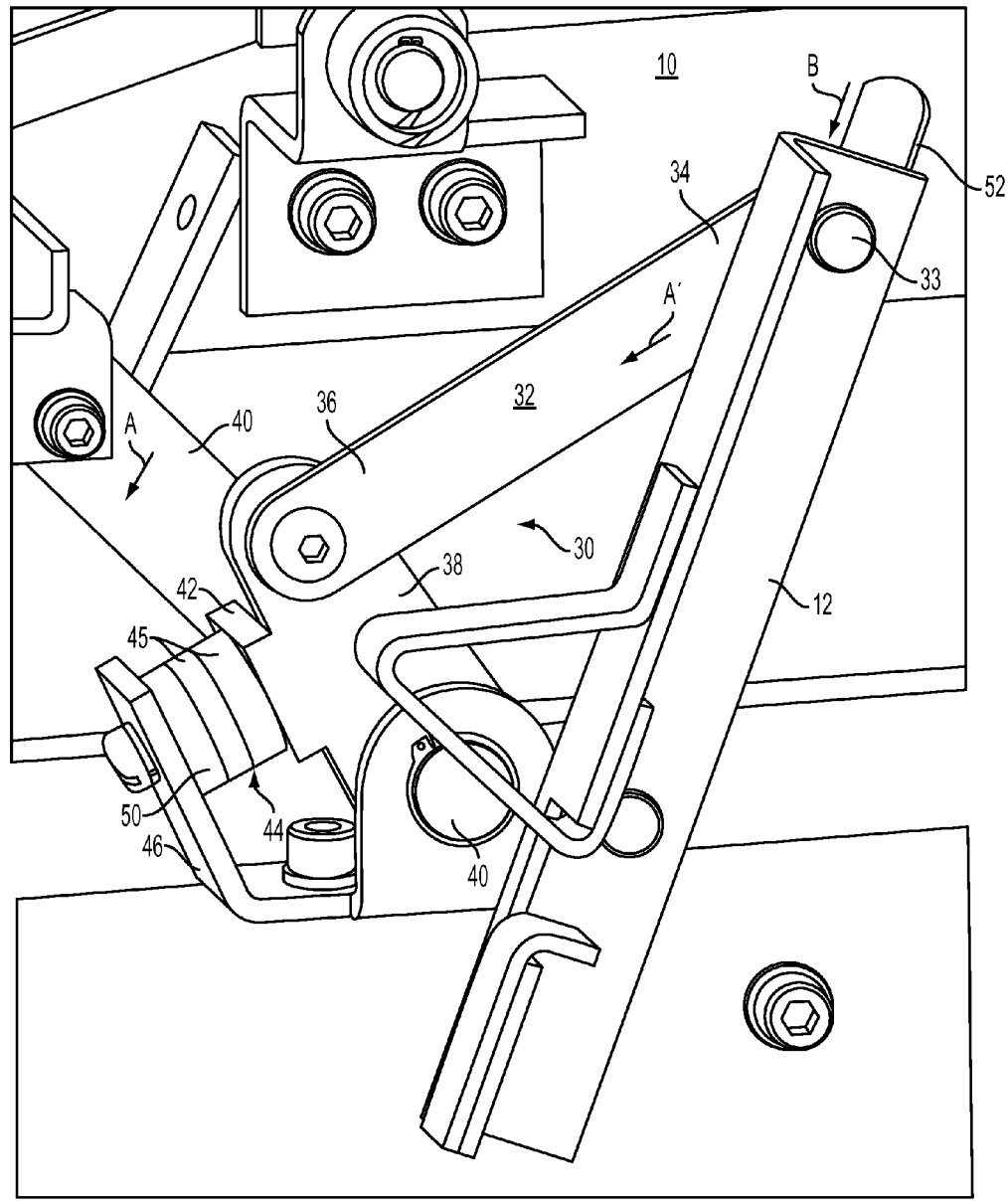
FIG. 2 is a view of linkage structure of a MOC operator structure associated with permanent magnet structure for maintaining the MOC operator structure in the open position.

An example of the vacuum circuit breaker 10 is a type VD4 vacuum circuit breaker manufactured by ABB. Referring to FIG. 1, the circuit breaker 10 has an operating shaft 28 coupled with the operating mechanism 18, which can be conventional push rods (not shown) for each of the exemplary three phases of circuit breaker 10. As shown in FIGS. 1 and 2, the shaft 28 is also coupled with the MOC operator structure 12 via linkage structure, generally indicated at 30. With reference to FIG. 2, the linkage structure 30 includes a link 32 coupled at one end 34 to a drive pin 33. The other end 36 of the link 32 is coupled to a lever 38, which in turn is coupled to shaft 40 for rotation therewith. Shaft 40 drives the breaker-panel interface structure 20 (not shown in FIG. 2). Shaft 40 is driven by the breaker operating mechanism 18, through a MOC drive assembly such as shaft 28 of FIG. 1 or by any suitable linkage.

An armature 42 of magnetic material and preferably made of steel, is fixed to or integral with the linkage structure, for example, by welding or is made integral with the lever 38. Preferably stationary permanent magnet structure, generally indicated at 44, is disposed generally adjacent to the armature 42. In the embodiment, at least one permanent magnet 45 is mounted to a bracket 46 that is fixed to, or otherwise associated with, a frame 48 of the circuit breaker 10. Cushion structure, preferably in the form of an elastomeric member such as an elastomeric washer 50, is provided between the permanent magnet structure 44 and the bracket 50 to absorb shock and allow for optimum alignment with the armature, as will be explained more fully below. As shown in FIG. 2, two magnets 45 may be provided for increased magnetic field holding strength.

When the circuit breaker opens, shaft 28 of operating mechanism 18 which is coupled by a linkage (not shown and the details of which are not pertinent to this invention) to shaft 40 causes shaft 40 and lever 38 to move in the direction shown by arrow A, pulling linkage 32 in the direction of arrow A'. End 34 of linkage 32 is coupled to drive pin 33. Drive pin 33 is guided by slot 52 and the MOC operator structure 12 thus moves in the direction of arrow B to the open position. It is noted that the supporting structure for the MOC operator structure 12 is not shown in FIG. 2 so internal components can be seen. Due to rotation of the lever 38 (in the arrow A direction), the armature 42 magnetically engages the permanent magnet structure 44 so that the strong attractive force firmly holds lever 38 to thus maintain the MOC operator structure 12 in the open position as shown in FIG. 2. Thus, the magnetic force on the lever 38 prevents false operation of the MOC operator structure 12 during a seismic event (e.g., earthquake) by ensure sufficient holding force is available in the open position thereof. Furthermore, even in applications where seismic considerations are not relevant, the attractive force between armature 42 and permanent magnet 45 ensures the MOC operator 12 is in a fully open position. Thus, no return spring is necessary, or if present for other reasons (e.g., to return the MOC operator structure 12 to the open position when the breaker is operated out of the cell), the return spring can be of minimal force.

Figure 3:
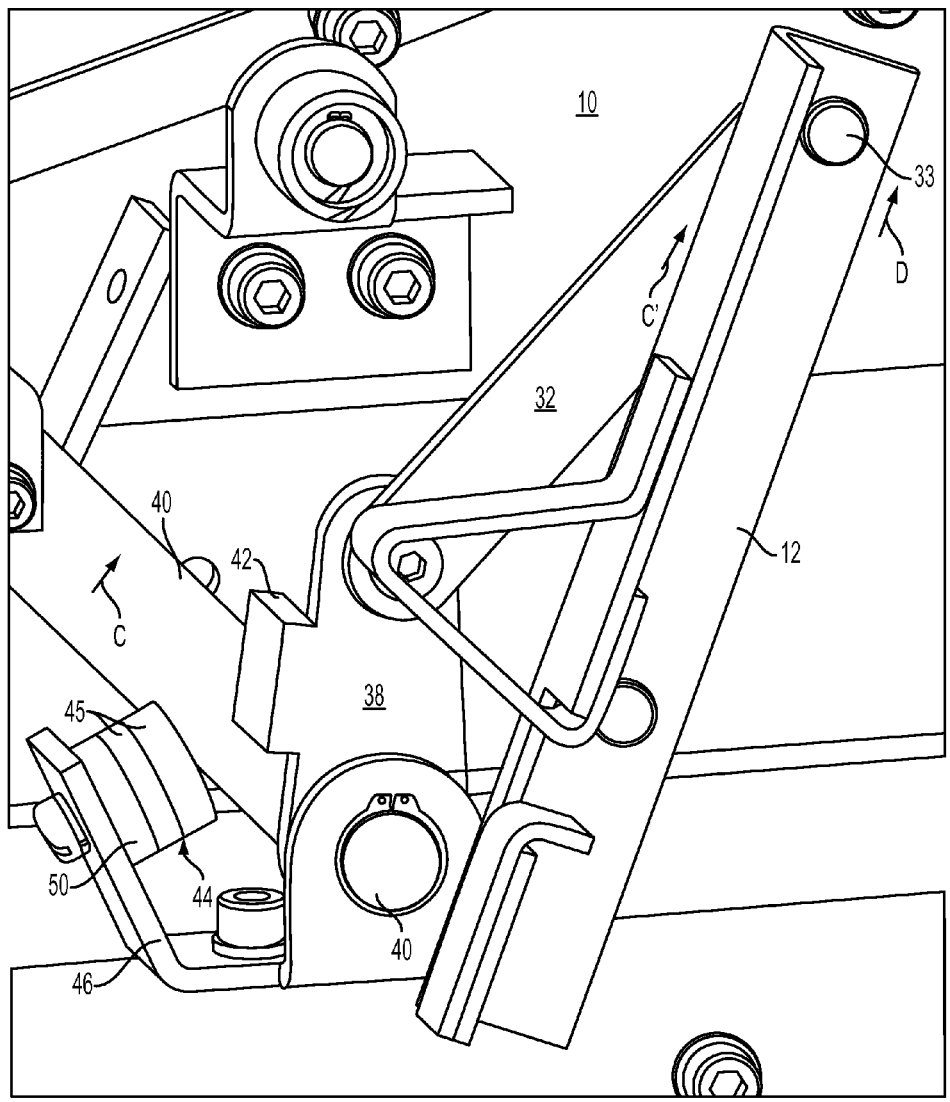
FIG. 3 is a view of the linkage structure of MOC operator structure shown in a closed position.

With reference to FIG. 3, during the closing operation of the circuit breaker, the operating mechanism 18 is coupled via shaft 28 to shaft 40 via a linkage (not shown and the details of which are not pertinent to this invention) and causes shaft 40 and lever 38 to move in the direction of arrow C (opposite direction A). This causes the link 32 to move in a second linkage direction (direction of arrow C') thereby pushing drive pin 33 in the direction of arrow D (opposite direction B) causing the MOC operator structure 12 to move to the closed position, in the process overcoming the magnetic force and thereby magnetically disengaging the armature 42 from the permanent magnet structure 44. This disengagement happens early in the closing sequence when a typical circuit breaker mechanism has maximum energy and the opposing force from main contact assembly 14 is negligible. Once an air gap is opened between the armature 42 and the permanent magnet structure 44, the attractive magnetic force decreases rapidly. As the closing operation proceeds, the force from the magnetic latch quickly approaches zero. Only the energy to break the initial magnetic holding force is extracted from the circuit breaker operating mechanism 18 and that is done at the best possible time.

An additional enhancement to the embodiment is possible, depending upon the need to reduce the MOC energy requirements on closing to the lowest practical value. In this enhanced embodiment of the magnetic latch, an electromagnetic coil 54 (FIG. 1) can be added that is electrically in parallel with the closing coil of the circuit breaker. The winding of the coil is such that when energized at the same time as the breaker closing coil, the coil generates a magnetic field that opposes the permanent magnet field, quenching the permanent magnetic field and the attractive force on the armature 42 attached to the MOC linkage structure 30 to substantially zero. This reduces the additional energy required from the circuit breaker mechanism for overcoming the open latch to zero at the expense of a slightly increased closing circuit current. It is not expected that this added coil will be necessary in most cases. A further variant of this same option is to mount the permanent magnet structure 44 on the moving MOC linkage structure 30 and oversize the demagnetizing coil 54 in such a way as it acts as a solenoid to push the permanent magnet structure 44 away and thus increase the initial closing force of the MOC operator structure 12.

The conventional return spring solution discussed above in the Background, provides the least amount of force when the circuit breaker is in its open position and the most force when the circuit breaker is in its closed position. This is the opposite of what is desired. The embodiment provides maximum force in the circuit breaker open position which rapidly decreases to a negligible amount of force as the closing operation proceeds. With a small increase in material cost and complexity, it is possible to even reduce this initial force to zero.

Although the linkage structure 30 of the embodiment employs rotatory motion of shaft 40, it can be appreciated that the linkage structure can be configured to provide a completely linear drive to the breaker-panel interface structure 20. In addition although, in the embodiment, the permanent magnet 45 is shown fixed to the circuit breaker 10 and the armature 42 is a moving member, it can be appreciated that the magnet 45 can be the moving member when the armature fixed to the circuit breaker 10.

Although the embodiment involves holding the MOC operator structure 12 in the open position, the permanent magnet structure could strengthen the closed position as well by positioning an armature 42 and associated permanent magnet structure 44 in the appropriate location.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A mechanism-operated cell (MOC) operator structure for a circuit breaker, the circuit breaker including an operating mechanism that closes main contacts of the circuit breaker, the MOC operator structure being associated with an interface structure for controlling auxiliary switches, the MOC operator structure comprising:
   linkage structure constructed and arranged to be coupled between the operating mechanism and the interface structure,
   an armature associated with the linkage structure, and
   permanent magnet structure associated with the circuit breaker and disposed generally adjacent to the armature,
   wherein, when the operating mechanism is coupled with the linkage structure and at least a part of the operating mechanism moves in a first mechanism direction, a portion of the linkage structure moves in a first linkage direction and moves the MOC operator structure to an open position, with the armature being magnetically engaged with the permanent magnet structure to maintain the MOC operator structure in the open position, and when the portion of the operating mechanism moves in a second mechanism direction, the portion of the linkage structure moves in a second linkage direction and moves the MOC operator structure to a closed position, with the armature magnetically disengaging from the permanent magnet structure.

2. The MOC operator structure of claim 1, wherein the armature is made of a magnetic material.

3. The MOC operator structure of claim 1, wherein the permanent magnet structure is mounted on a bracket, the bracket being constructed and arranged to be fixed with respect to the circuit breaker.

4. The MOC operator structure of claim 3, further comprising a cushion structure between the permanent magnet structure and the bracket.

5. The MOC operator structure of claim 4, wherein the cushion structure is an elastomeric member.

6. The MOC operator structure of claim 1, wherein the linkage structure includes a link constructed and arranged to be coupled to an operating shaft of the operating mechanism, a lever coupled to the link so that movement of the link rotates the lever, and a shaft coupled to the lever for rotation therewith, the shaft being constructed and arranged to drive the interface structure.

7. The MOC operator structure of claim 6, wherein the armature is fixed to the lever for rotation therewith.

8. The MOC operator structure of claim 6, wherein the armature is integral with the lever for rotation therewith.

9. The MOC operator structure of claim 1, further comprising an electromagnetic coil constructed and arranged such that when energized, the coil generates a magnetic field that opposes a magnetic field of the permanent magnet structure, driving the magnetic field of the permanent magnet structure and attractive force on the armature to substantially zero.

10. The MOC operator structure of claim 1, wherein the permanent magnet structure includes at least one permanent magnet.

11. The MOC operator structure of claim 1, wherein the armature is integral with the linkage structure.

12. A method of securing a mechanism-operated cell (MOC) operator structure of a circuit breaker in an open position, the circuit breaker including an operating mechanism that closes main contacts of the circuit breaker, the MOC operator structure being associated with an interface structure for controlling auxiliary switches, the method comprising the steps of:
   coupling the MOC operator structure between the operating mechanism and the interface structure such that movement of a part of the operating mechanism moves MOC operator structure between the open position and a closed position, and
   providing a magnetic field to magnetically hold the MOC operator structure when in the open position, with strength of the magnetic field permitting movement of the MOC operator structure by the operating mechanism from the held open position to the closed position.

13. The method of claim 12, wherein the step of providing a magnetic field provides permanent magnet structure associated with the circuit breaker and disposed generally adjacent to a movable portion of MOC operator structure so as to attract the portion of the MOC operator structure towards the permanent magnet structure in the open position.

14. The method of claim 13, wherein the portion of the MOC operator structure is an armature, containing magnetic material, associated with linkage structure of the MOC operator structure.

15. The method of claim 14, wherein the armature is integral with the linkage structure.

16. The method of claim 13, wherein the permanent magnet structure includes at least one permanent magnet.

17. The method of claim 13, further comprising:
   mounting the permanent magnet structure on a bracket that is fixed to the circuit breaker.

18. The method of claim 17, further comprising:
providing a cushion structure between the permanent magnet structure and the bracket.

19. The method of claim 13, further comprising:
providing an electromagnetic coil such that when energized, the coil generates a second magnetic field that opposes a magnetic field of the permanent magnet structure, driving the magnetic field of the permanent magnet structure and attractive force on the MOC operator structure to substantially zero.

* * * * *